(12) United States Patent
Choi

(10) Patent No.: US 6,557,935 B2
(45) Date of Patent: May 6, 2003

(54) ANTI-SUBMARINE DEVICE OF A SEAT FOR AN AUTOMOBILE

(75) Inventor: Byung-Young Choi, Kyoungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/119,964

(22) Filed: Apr. 9, 2002

(65) Prior Publication Data

US 2003/0034679 A1 Feb. 20, 2003

(30) Foreign Application Priority Data

Aug. 14, 2001 (KR) .................................... 2001-0049066

(51) Int. Cl.[7] ................................................. B60N 2/42
(52) U.S. Cl. ..................................... 297/216.1; 297/313
(58) Field of Search ......................... 297/216.1, 216.18, 297/216.19, 284.11, 313

(56) References Cited

U.S. PATENT DOCUMENTS

| | | | | | |
|---|---|---|---|---|---|
| 5,556,160 A | * | 9/1996 | Mikami | .................... | 297/216.1 |
| 5,558,399 A | * | 9/1996 | Serber | ..................... | 297/284.4 |
| 5,567,006 A | * | 10/1996 | McCarthy | ............. | 297/216.15 |
| 5,855,411 A | * | 1/1999 | Inoue | .................... | 297/216.19 |

* cited by examiner

*Primary Examiner*—Anthony D. Barfield
(74) *Attorney, Agent, or Firm*—Pennie & Edmonds LLP

(57) ABSTRACT

An anti-submarine device installed to the seat frame of an automobile for preventing a submarine phenomenon, and more particularly, an anti-submarine device capable of providing a passengers with comfort when sitting and rigidly holding the buttocks of a passenger at the front end of a seat cushion by a protruding means which protrudes the front end of the seat during a head-on collision or sudden stop.

4 Claims, 2 Drawing Sheets

ANTI-SUBMARINE DEVICE OF A SEAT FOR AN AUTOMOBILE

FIELD OF THE INVENTION

The present invention relates to an anti-submarine device installed to the seat frame of an automobile seat for preventing the submarine phenomenon from acting on a seat occupant in sudden stops, such as head-on collisions.

BACKGROUND OF THE INVENTION

In a head-on collision or other sudden stop, passengers wearing a seatbelt in the front seat may experience their buttocks being thrown forward and pushed below the seat cushion by inertial force. This situation is referred to as a "submarine phenomenon." The submarine phenomenon sometimes causes a seatbelt to compress the upper abdominal region of the passenger with the danger of a visceral rupture.

Considering the above-described danger, a conventional seat structure for a vehicle, as shown in FIG. 4, is provided with a seat frame 100 having an incline 200 adjacent to the front end thereof for preventing the submarine phenomenon. The conventional seat structure, however, is disadvantageous in that an additional process is required to attach the incline 200 to the seat frame 100. Also, this type of anti-submarine is not efficient because the incline 200 is usually made of a foam material, such as a polyurethane having a resilient property, and the protrusion of the seat cushion at incline 200 can cause passenger discomfort along the thighs.

Consequently, a seat assembly according to the prior art is not able to meet the requirements of improved in comfort and anti-submarine function at the same time.

SUMMARY OF THE INVENTION

The present invention provides an anti-submarine device, which enables the front end of a seat cushion to be placed downward such that passengers, including a driver, feel comfortable when an automobile is driving normally, and which enables the front end of the seat cushion to upwardly protrude so as to rigidly hold the buttocks of the passenger during a head-on collision or sudden stop. Accordingly, it is possible to provide an anti-submarine device of a seat for an automobile capable of simultaneously addressing the comfort of the seat and function to prevent the submarine phenomenon.

In a preferred embodiment of the present invention, such as anti-submarine device comprises a submarine bar, push links, a stopper, a push panel and a torsion spring. The submarine bar has one side edge pivotally connected to a first pivotal shaft in order to permit upward rotation through an opening formed on a seat frame. The downwardly curved push links have an end rotatably fixed to the both sides of the submarine bar by means of pins. The stopper is inserted into guide slots formed at the ends of the push links. The slots have a certain length, which limits the operation of the push links within a predetermined range. The push panel is integrally formed with the opposite ends of the push links. The panel is capable of rotating around a second pivotal shaft by the load of femoral region of the passenger during a head-on collision or other sudden stop. The torsion spring is installed on the second pivotal shaft in order to return the push panel to the original state when the load applied to the push panel is released.

In an alternative preferred embodiment of the invention, an automobile seat including an anti-submarine device comprises a seat frame defining an opening with a prism shaped member disposed therein. A first pivot shaft is disposed along a front edge of the opening. The prism shaped member is pivoted on the pivot shaft along one edge or apex of the prism. A second pivot shaft is mounted on the seat frame behind the opening. A push panel pivotably mounted on the second pivot shaft is positioned in the seat frame to be depressed by load from a seat occupant in a sudden stop condition. A linkage is provided between the push panel and prism shaped member such that depression of the push panel raises the prism shaped member to prevent submarining of a seat occupant during a sudden stop. The prism shaped member may be referred to as a submarine bar.

Preferably the linkage comprises push links and a stopper bar. First and second push links are disposed at opposite ends of the push panel and linked to opposite ends of the prism shaped member. The push links are non-rotatably fixed to the push panel and rotatably attached to the prism shaped member. Each push link also defines a longitudinally running guide slot adjacent the prism shaped member. The stopper bar is slidably received in the guide slots to limit movement of the linkage through a predetermined range. At least one torsion spring is preferably mounted on the second pivot shaft acting on the push panel to return the push panel after depression.

DETAILED DESCRIPTION OF THE INVENTION

Figure 1:
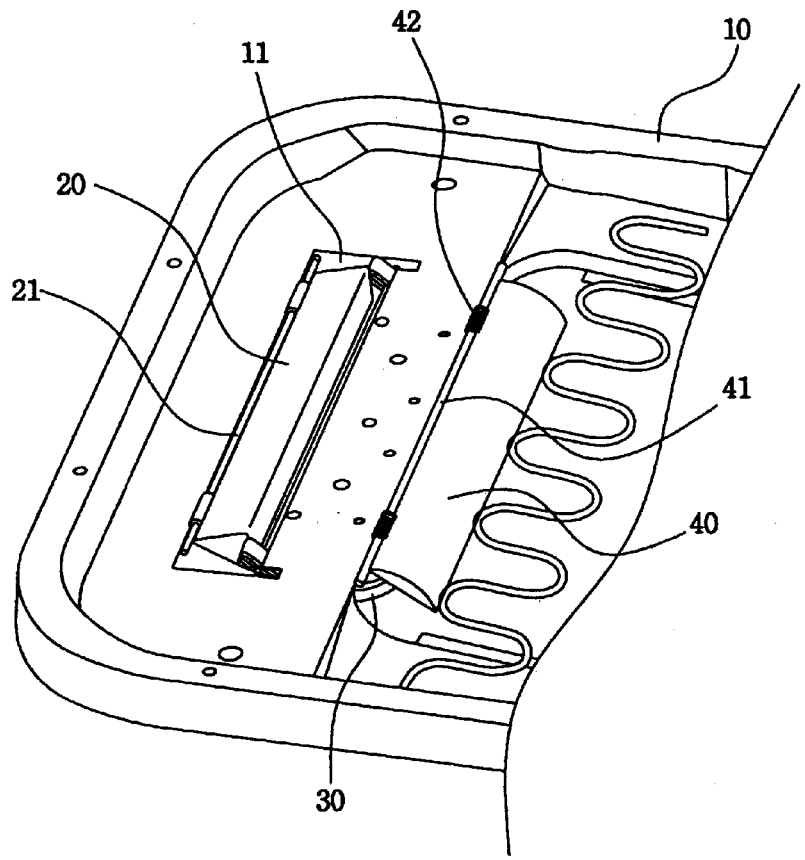
FIG. 1 is a perspective view of an anti-submarine device installed to the seat frame of an automobile according to the present invention.
Figure 2:
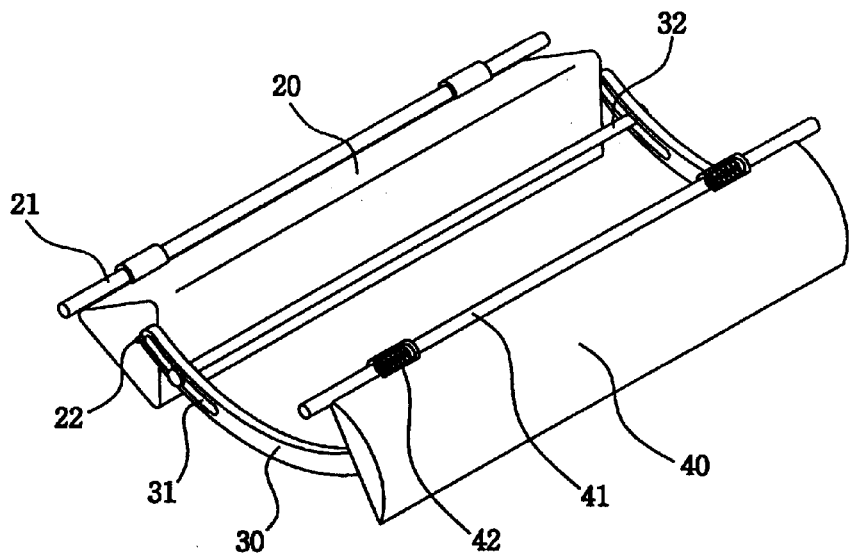
FIG. 2 and FIG. 3 are perspective views illustrating the operation of an anti-submarine device according to the present invention.
Figure 3:
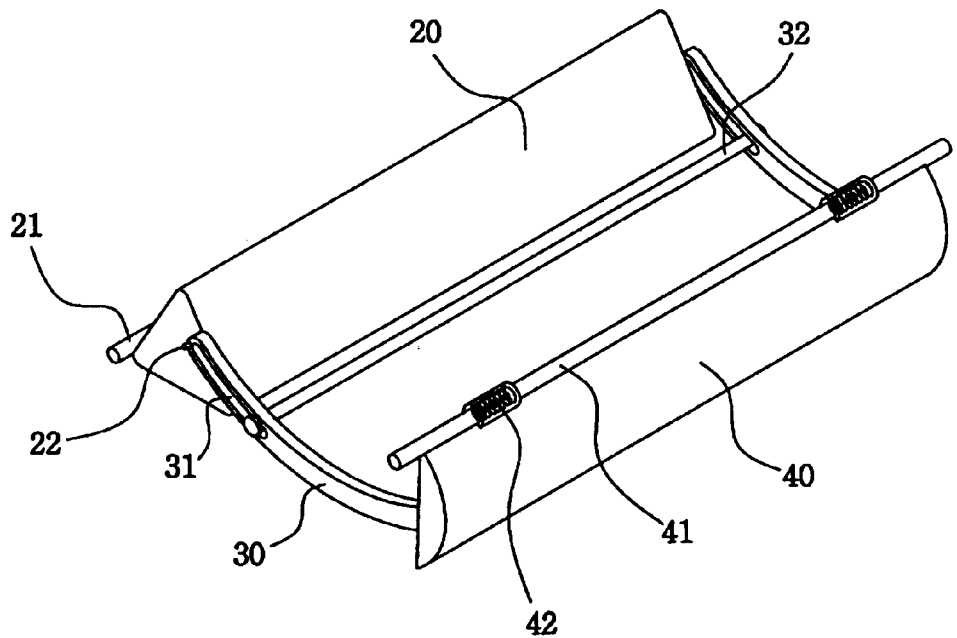
Figure 4:
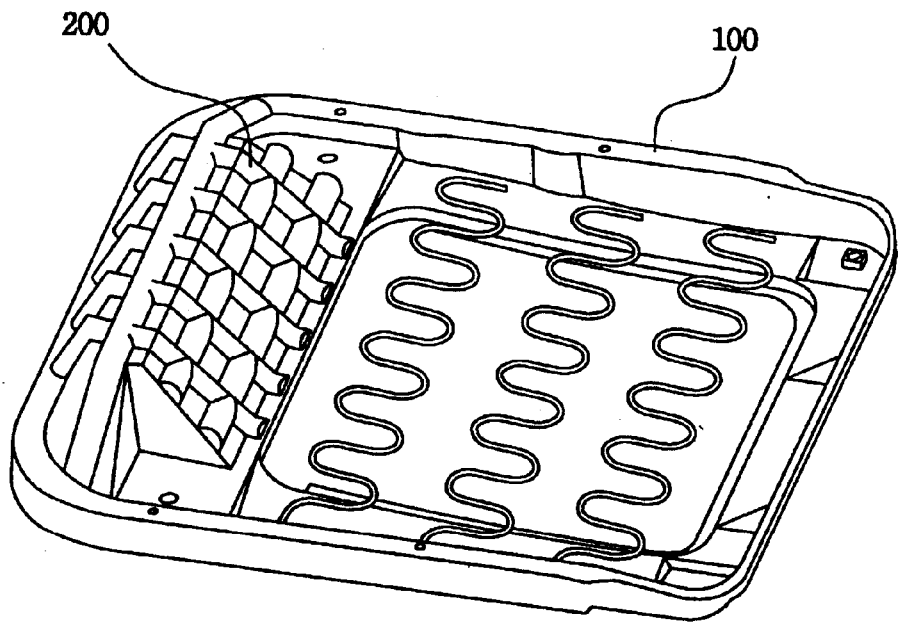
FIG. 4 is a perspective view showing an anti-submarine device installed to the seat frame of an automobile according to the prior art.

As shown in FIG. 1, an opening 11 is formed at the front end of the seat frame with the size being configured for submarine bar 20 to freely rotate upward over a predetermined range. The submarine bar 20, whose one side edge is pivotally connected to first pivotal shaft 21 attached to the seat frame 10, is placed within said opening 11. The submarine bar 20 preferably has the shape of a triangular prism.

The submarine bar 20 is upwardly rotated around the first pivotal shaft 21 when a pushing force caused by the push panel 40 is transferred to the pins 22 through the push links 30. The push links 30 are rotatably connected to the submarine bar 20 by means of the pins 22 at one end. The opposite ends of the push links are integrally connected to the push panel 40. Push links 30 preferably have a downwardly curved shape in the orientation shown in the drawings.

It is preferable for the push panel 40 to be a half-circle cylinder shape so that the push panel 40 can be easily pushed by the femoral region of a passenger. The distance from the first pivotal shaft 21 to the second pivotal shaft 41 is properly set in accordance with the embodiment. The torsion springs 42 are installed on the second pivotal shaft 41 in order for the push panel 40, moved during a head-on collision, to be returned to its original state when the load applied to the push panel 40 is released.

Referring to the push link 30, one end thereof has a guide slot 31 with a certain length in a longitudinal direction. The stopper 32, fixed to the seat frame 10, is inserted into said guide slot 31 so that the operation of the push link 30 is limited within an optimum range. Accordingly, the protrusion of a seat cushion is controlled in an optimized height during a head-on collision or sudden stop.

With the embodiment described above, the operation will be explained as set forth hereunder.

1) When a head-on collision or sudden stop occurs, the femoral region of a passenger is moved downward (so-called 'submarine phenomenon') to shove the push panel 40.

2) Subsequently, the push links 30, acted on by the push panel 40, push the submarine bar 20 through the pins 22 connection, so that said submarine bar 20 is upwardly rotated around the first pivotal shaft 21.

3) The protrusion of the seat cushion, properly controlled at an optimized height by the stopper 32 and the guide slot 31, effectively prevents the submarine phenomenon by holding the buttocks of a passenger.

As described above, the present invention enables the front end of a seat cushion to be placed downward in order for passengers including a driver to feel comfortable when an automobile is normally driving and which enables the front end of the seat cushion to upwardly protrude so as to rigidly holding the buttocks of passengers during a head-on collision or sudden stop.

What is claimed is:

1. An anti-submarine device installed to the seat frame of an automobile comprising:

a submarine bar having one side edge pivotally connected to a first pivotal shaft in order to upwardly rotate through an opening formed on a seat frame;

push links rotatably fixed to opposite ends of said submarine bar by means of pins, wherein said push links have a downwardly curved shape;

a stopper inserted into guide slots formed at an end of said push links, said guide slots having a length to limit the operation of said push links within a predetermined range;

a push panel integrally formed with the said push links opposite the stopper, the push panel capable of rotating around the second pivotal shaft in response to load from a femoral region of a passenger during a head-on collision; and a torsion spring installed on said second pivotal shaft to return said push panel to the original state when the load applied to said push panel is released.

2. An automobile seat including an anti-submarine device, comprising:

a seat frame defining an opening;

a first pivot shaft disposed along a front edge of said opening;

a prism shaped member disposed in said opening and pivoted on said pivot shaft along an edge of said prism;

a second pivot shaft mounted on said seat frame behind said opening;

a push panel pivotably mounted on said second pivot shaft, the push panel being positioned in said seat frame to be depressed by load from a seat occupant in a sudden stop condition; and a linkage between said push panel and prism shaped member such that depression of the push panel raises said prism shaped member to prevent submarining of a seat occupant during a sudden stop.

3. The automobile seat according to claim 2, wherein said linkage comprises:

first and second push links disposed at opposite ends of the push panel and linked to opposite ends of the prism shaped member, said push links being non-rotatably fixed to the push panel and rotatably attached to the prism shaped member, each said push link defining a longitudinally running guide slot adjacent the prism shaped member; and a stopper bar slidably received in said guide slots to limit movement of the linkage through a predetermined range.

4. The automobile seat according to claim 3, further comprising at least one torsion spring mounted on the second pivot shaft acting on the push panel to return said push panel after depression.

* * * * *